United States Patent
Menezes (10) Patent No.: US 7,254,812 B1
(45) Date of Patent: Aug. 7, 2007

(54) MULTI-PROCESSOR TASK SCHEDULING

(75) Inventor: Evandro Menezes, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 823 days.

(21) Appl. No.: 10/159,345

(22) Filed: May 31, 2002

(51) Int. Cl.
*G06F 9/46* (2006.01)
*G06F 1/26* (2006.01)

(52) U.S. Cl. ............ 718/102; 718/100; 718/105; 713/320

(58) Field of Classification Search ........ 718/100–108; 713/300, 320, 323
See application file for complete search history.

(56) References Cited

U.S. PATENT DOCUMENTS

| | | | | |
|---|---|---|---|---|
| 3,905,023 A | * | 9/1975 | Perpiglia ............... | 714/6 |
| 5,142,684 A | * | 8/1992 | Perry et al. ............ | 713/320 |
| 5,418,953 A | * | 5/1995 | Hunt et al. ............ | 718/102 |
| 5,613,136 A | * | 3/1997 | Casavant et al. ....... | 712/28 |
| 5,745,757 A | * | 4/1998 | Lecourtier ............. | 718/102 |
| 5,875,464 A | * | 2/1999 | Kirk ..................... | 711/129 |
| 6,006,248 A | * | 12/1999 | Nagae ................... | 718/105 |
| 6,763,519 B1 | * | 7/2004 | McColl et al. ......... | 718/100 |
| 6,772,189 B1 | * | 8/2004 | Asselin ................. | 718/100 |
| 6,823,516 B1 | * | 11/2004 | Cooper ................. | 718/108 |
| 6,901,521 B2 | * | 5/2005 | Chauvel et al. ........ | 713/300 |
| 6,986,066 B2 | * | 1/2006 | Morrow et al. ........ | 713/320 |
| 7,028,302 B2 | * | 4/2006 | Kiick .................... | 718/105 |

* cited by examiner

*Primary Examiner*—Meng-Al T. An
*Assistant Examiner*—Jennifer N. To
(74) *Attorney, Agent, or Firm*—Zagorin O'Brien Graham LLP (57) ABSTRACT

An information processing system is configured to schedule tasks to a plurality of processors using processor performance information. For example, the maximum performance level of each of the processors, the current performance level of each of the processors, and the number of processors can be used to schedule tasks to one or more of the processors. A task distribution frequency which takes this information into account can be useful. One such task distribution frequency $f_i$ is calculated so that $f_i = D_i / \Sigma D_i$ where i ranges from 1-N and $D_i = MP_i / CP_i / N$, where $MP_i$ is a maximum performance level for the processor i, $CP_i$ is a current performance level for the processor i, and N is the number of processors. Tasks are distributed according to the task distribution frequency $f_i$.

24 Claims, 3 Drawing Sheets

MULTI-PROCESSOR TASK SCHEDULING

BACKGROUND

1. Field

The present invention relates to information processing systems, and, more particularly, to multi-processor task scheduling in such systems (e.g., for power management in a multiprocessor environment).

2. Description of the Related Art

Many information processing systems include multiple processors. These systems often use a multi-tasking operating system scheduler to assign tasks to the processors. Such schedulers typically assume that all of the processors are identical and thus schedule tasks to processors without regard to performance differences between the processors.

However, modern systems may have multiple processors, each with potentially different or changeable performance characteristics. For example, the instantaneous frequency in each processor can be changed dynamically, effectively creating different performance states and performance ranges for each processor. A conventional task scheduler would not have maximal efficiency in such a system because tasks could be equally scheduled to run on processors with different processing performances or a task could be scheduled to run on a processor that has no performance headroom. Thus, there is a need for an improved scheduler, method of scheduling and for systems which take advantage of such schedulers and scheduling.

BRIEF DESCRIPTION

In one embodiment, a method of scheduling tasks in a multiprocessor system is provided. A number of processors within the multiprocessor system is determined. A maximum performance level of each of the processors is also determined. A current performance level of each of the processors is also determined. Tasks are scheduled to one or more of the processors based at least in part on the determined number and performance levels.

In a further embodiment, a task distribution frequency is determined at least in part on the determined number and performance levels. For example, a task distribution value for each processor i may be determined: $D_i = MP_i/CP_i/N$, where $MP_i$ is a relative maximum performance level for the processor i, $CP_i$ is a current performance level for the processor i, and N is the number of processors. The task distribution frequency $f_i$ may be determined: $f_i = D_i/\Sigma D_i$ where i ranges from 1-N. Tasks may be distributed according to the task distribution frequency $f_i$.

Other further embodiments are possible. For example, in one further embodiment, a reference performance level is determined (e.g., by determining a highest maximum performance level of the processors). In another further embodiment, the maximum performance levels are determined by, for example, determining a processor type by accessing a processor identifier, scheduling benchmark tasks to the processor and using benchmark task results information to determine the maximum performance level, querying a table of stored performance information regarding a plurality of types of processors, and/or determining a maximum frequency of a processor, or any other appropriate means.

In another embodiment, a method of scheduling tasks in a multiprocessor system is provided. Performance information regarding each of the plurality of processors is determined, and tasks are scheduled to each of the processors based at least in part on the determined performance information. The performance information may be determined, for example, by determining a maximum performance level of at least one of the processors, and determining a current performance level of at least one of the processors, and even by determining a number of processors to which tasks are to be scheduled. A reference performance level may also be determined (e.g., by determining a highest maximum performance level of all maximum performance levels of the processors and setting the reference performance level to the highest maximum performance level). A relative maximum performance level of each processor may be determined using the maximum performance level of each processor and the reference performance level.

In other further embodiments, a task distribution frequency may be determined. Tasks may be scheduled to the plurality of processors during the step of scheduling tasks to substantially achieve the task distribution frequency. The task distribution frequency may be determined by dividing the relative maximum performance level of each processor by the current performance level to provide an initial result, dividing the initial result by the number of processors to provide a task distribution value $D_i$ for each processor, summing the task distribution values for the processors to provide a task distribution sum, and dividing each task distribution value by the task distribution sum.

In another embodiment, an apparatus includes instructions encoded on one or more computer-readable media. Instructions are encoded to determine performance information regarding each of a plurality of processors in a multiprocessor system and to schedule tasks to each of the processors based at least in part on the determined performance information. For example, a scheduler may be provided in a memory for execution by a processor in a multiprocessor system. The scheduler may include instructions to perform any of the steps or operation of the above mentioned methods, which are further described hereafter. In various embodiments, the apparatus may take many forms from software encoded in a memory (volatile and nonvolatile) to a computer system including encoded instructions such as software and firmware to a network of processors. Various processors within or without the apparatus may provide processor performance information to the aforementioned scheduler.

The foregoing provides a brief description, or summary, of certain embodiments discussed in greater detail in the detailed description below. Consequently, the foregoing contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

DETAILED DESCRIPTION

The following discussion is intended to provide a detailed description of at least one example of the invention and should not be taken to be limiting of the invention itself. Rather, any number of variations may fall within the scope of the invention which is properly defined in the claims following this description.

Figure 1:
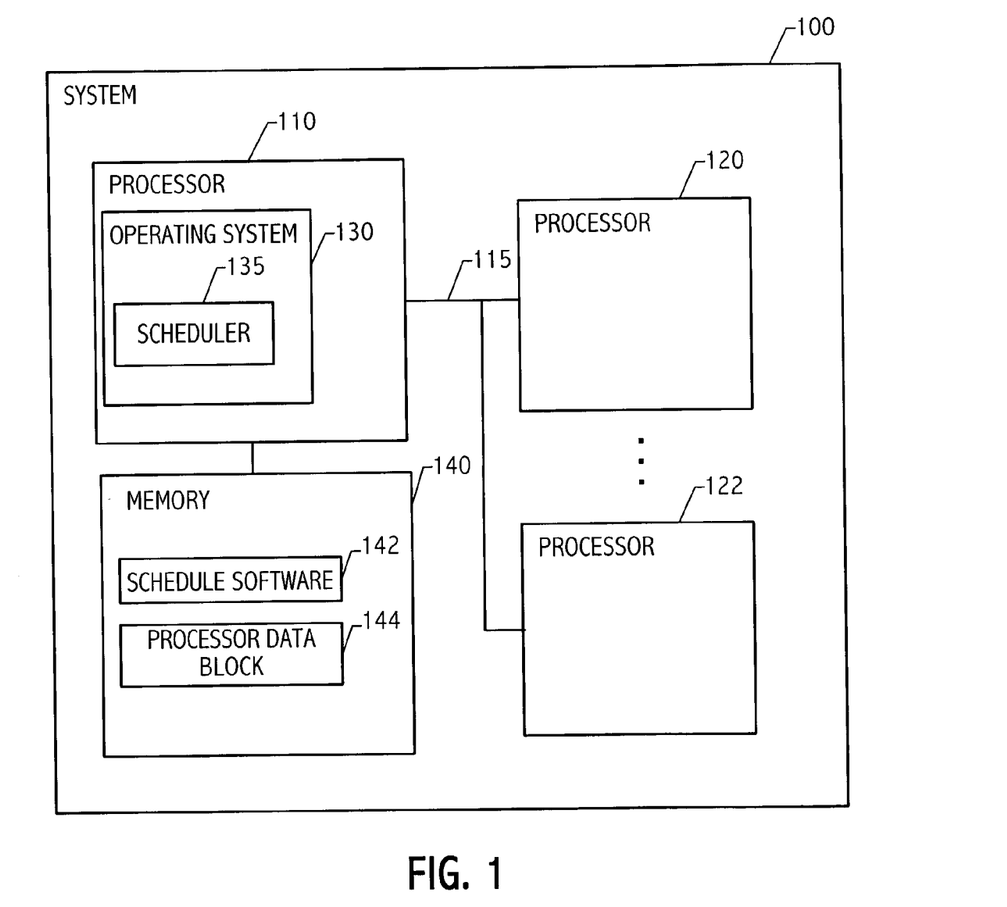
FIG. 1 is a block diagram of an information processing system including a scheduler in accordance with the invention.

FIG. 1 shows a multiprocessor system 100. System 100 includes a number of processors including, for example, processors 110, 120 and 122. Although processors 110, 120 and 122 are shown coupled together by bus 115, bus 115 is merely an exemplary coupling, and any well-known or specialized technique for coupling multiple processors within a system may be used. In one embodiment, a north bridge circuit is used to couple processors 120 and 122 to processor 110.

Processors 110, 120 and 122 provide processing power to handle various information processing tasks. Processor 110 includes operating system (OS) 130. OS 130 includes task scheduler 135 for scheduling the information processing tasks for execution by processors 110, 120, and 122. For example, scheduler 135 selects one of processors 110, 120 and 122 for each task and initiates the routing of each task to the selected processor.

Scheduler 135 is a software program operating within the context of OS 130. Scheduler 135 is loaded from memory upon processor 110 becoming operational. For example, scheduler may be loaded from the memory 140 which is coupled to processor 110. Memory 140 includes schedule software 142 which is accessed to initiate operation of scheduler 135. Memory 140 also includes processor data block 144 for storing performance information and other information regarding the various processors within system 100. Memory 140 is representative of any type of memory, and may be coupled to or integral with processor 110 in any appropriate manner known to those skilled in the art.

In the embodiment shown in FIG. 1, system 100 is a symmetric multiprocessing (SMP) system. For example, system 100 processes programs using multiple processors that share a common operating system 130 and memory 140. A single copy of operating system 130 is in charge of all the processors 110, 120, 122. SMP systems are also known as "shared everything" systems.

Figure 2:
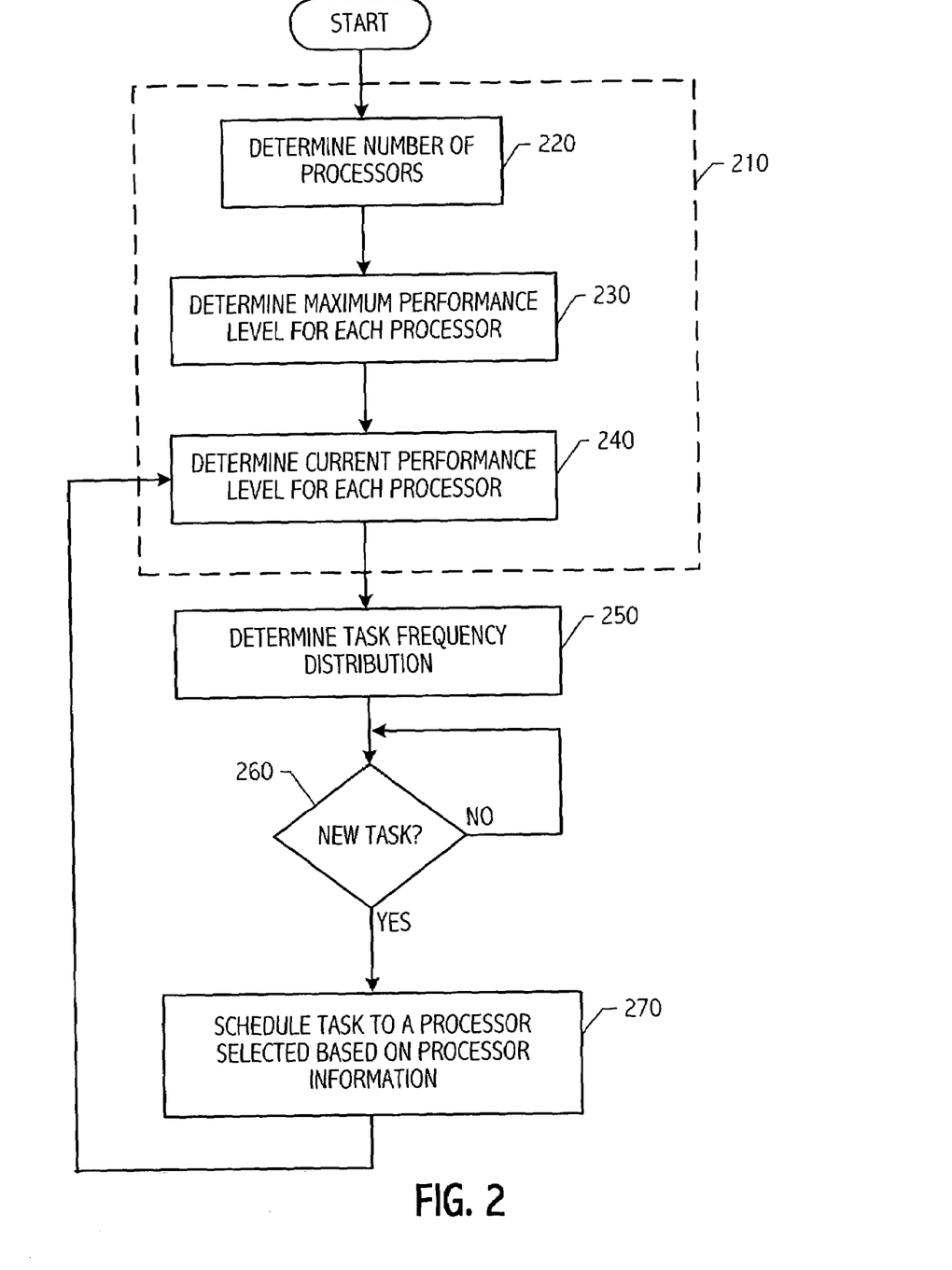
FIG. 2 is a flowchart showing the operation of the scheduler in FIG. 1.

FIG. 2 shows an exemplary set of operations of one embodiment of scheduler 135. Scheduler 135 receives information regarding the processors of system 100 during operation 210. After information regarding the processors is gathered, scheduler 135 or another program processes the information during operation 250. After the information is processed into a form useable by scheduler 135, scheduler 135 awaits new tasks at operation 260. If a new task is received at operation 260, scheduler 135 uses the processor information to efficiently select a processor for the new task at operation 270. This process repeats itself with scheduler 135 receiving and processing updated processor information at operations 240 and 250, and receiving and scheduling new tasks at operations 260 and 270, respectively.

Figure 3:
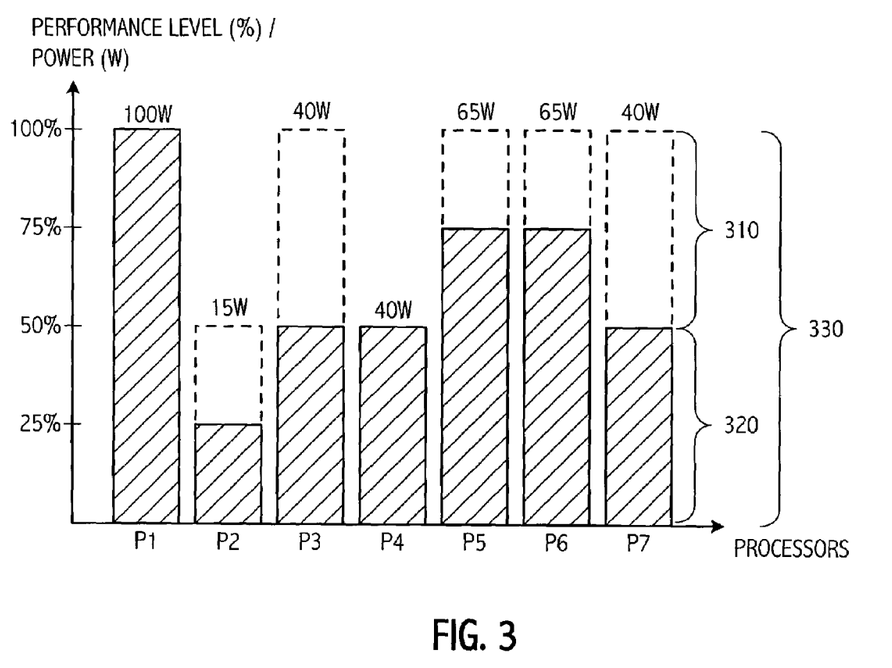
FIG. 3 is a histogram showing a snapshot of performance information regarding processors in a multiprocessor system including at least the seven processors shown.

During operation 210, several types of information regarding the processors within system 100 is gathered. For example, the number of processors in system 100 is determined during operation 220. FIG. 1 explicitly shows three processors 110, 120 and 122, but implicitly represents additional processors. Scheduler 135 determines how many processors are within a pool of processors for receiving scheduled tasks. Typically, this is all of the processors within system 100, but a subset plurality of processors may be designated to receive scheduled tasks. FIG. 3 shows the operational state of an embodiment of a system including at least seven exemplary processors.

Referring again to FIG. 2, after the number of system processors is determined, the maximum performance level for each processor in the scheduling pool is determined during operation 230. For example, scheduler 135 determines the maximum processing power of each of processors 110, 120 and 122. In the exemplary embodiment shown in FIG. 3, scheduler 135 determined a maximum performance level for processors P1, P3, P5, P6 and P7 that is twice the maximum performance level for processors P2 and P4. If we define a reference maximum performance level to be at the highest maximum performance level determined during operation 230, then the maximum performance level for processors P1, P3, P5, P6 and P7 may be referenced as full or 100% of the reference value, and the maximum performance level for processors P2 and P4 may be referenced as half or 50% of the reference value. The lowest maximum power level may be used as a reference level. Other embodiments may use a different reference level which may or may not be dependent on actual or measured processor performance levels.

After the maximum performance level for each processor is determined, the current performance level for each processor is determined during operation 240. For example, as shown in FIG. 3, scheduler 135 determines the following about processors P1-P7: Processor P1 is operating at full capacity (100% of the reference performance level); Processor P2 is operating at half capacity (50% of P2's capacity and 25% of the reference performance level); Processor P3 is operating at half capacity (50% of P3's capacity and 50% of the reference performance level); Processor P4 is operating at full capacity (100% of P4's capacity and 50% of the reference performance level); Processor P5 is operating at ¾ capacity (75% of P5's capacity and 75% of the reference performance level); Processor P6 is operating at ¾ capacity (75% of P6's capacity and 75% of the reference performance level); Processor P7 is operating at half capacity (50% of P7's capacity and 50% of the reference performance level). Thus, processor P7 has a maximum performance level 330 which includes a current performance headroom 310 and a current performance level 320. In the present example, the current performance headroom 310 and the current performance level 320 are both at 50%.

The current performance level may be measured in many ways. For example, the performance levels discussed herein may be based on published values for known processors. A table of performance information may be stored in memory 140. This performance information may have been generated based on benchmark tasks executed by the various processors. For example, a benchmark may be run at three processor states (e.g., three frequencies), and performance information may be gleaned therefrom. Then, if scheduler 135 determines the current processor state (e.g., by determining the current processor frequency, power level, or OS time slice utilization) and the type of processor, scheduler 135 can look up or query a table or database (e.g., processor data block 144) for the maximum and current performance levels. Alternatively, the benchmarks may be run by the scheduler in system 100. Other proxies for performance level may be used such as various characteristics of the processors. In one embodiment, processors 120 and 122 self-regulate their frequency based on their task load (e.g., number and ages of pending tasks). Thus, scheduler 135 can determine the current operating frequency of those processors to determine their current performance level.

Referring again to FIG. 2, after the current performance level for each processor is determined, a task frequency distribution is calculated during operation 250. One method of calculating a task frequency distribution uses the following formula:

$$D_i = MP_i/CP_i/N$$

where $D_i$ is the task distribution value for an individual processor i, $MP_i$ is the relative maximum performance index for processor i, $CP_i$ is the current performance index for processor i, and N is the total number of processors. In this case, i varies between 1 and N. To determine the frequency with which to assign tasks to individual processors, the individual processor's task distribution value is divided by the sum of all the processors' task distribution values:

$$f_i = \frac{D_i}{\sum_{j=1}^{N} D_j}$$

During operation 260, scheduler 135 awaits new tasks for scheduling to select ones of processors 110, 120 and 122. When a new task is to be scheduled, scheduler 135 selects and issues the task to one of the processors which is underutilized given the current task distribution frequency.

In one embodiment, system 100 includes two processors 120 and 122 to which tasks are to be assigned. To simplify the discussion, processor 110 is a special purpose administrative processing element which does not get assigned tasks in this exemplary embodiment. In the present example, processor 120 has a performance profile of P1 and processor 122 has a performance profile of P3, both as shown in FIG. 3. For example, processor 120 has a maximum performance level of 1 (normalized to the maximum performance level in the overall system) and a current performance level of 1 (e.g., processing to the fullest extent at the maximum performance level). Processor 122 also has a maximum performance level of 1 (100% of the system's maximum performance level), and processor 122 has a current performance level of ½ of its own maximum performance level (e.g. processing at half of its capability). Their respective task distribution values are as follows:

$$D_{120P1} = 1/1/2 = 0.5$$

$$D_{122P3} = 1/½/2 = 1.0$$

Thus, the respective task distribution frequencies will be as follows:

$$f_{120P1} = 0.5/1.5 = 33.3\%$$

$$f_{122P3} = 1.0/1.5 = 66.77\%$$

Thus, scheduler 135 will assign tasks to processor 122 twice as often as tasks are assigned to processor 120. That is, ⅔ of the tasks are distributed to processor 122 and ⅓ of the tasks are distributed to processor 120.

This is especially useful if one takes into account the effective power levels at which each processor is operating. For example, a processor such as P1 operating at the maximum reference value will be operating at an exemplary power level of 100 W, whereas a processor operating at a performance level of half the reference value will be operating at an exemplary power level of 40 W. Thus, the combined wattage is 140 W before adjustments are made. After a period of time in which a greater number of tasks are assigned to processor 122 than to processor 120, processors 120 and 122 will migrate from states such as those shown by processors P1 and P3, respectively, to approach respective states such as those shown with regard to processors P5 and P6. As shown in FIG. 3, the total wattage of processors P5 and P6 is 130 W. Thus, the effect of the foregoing task distribution scheme in this example is that more tasks will be assigned to processor P3 to equalize the load on the processors and to ultimately reduce the power consumed. In this manner, performance is substantially unaffected, but a power savings of 10 W is achieved.

In another embodiment, system 100 includes two processors 120 and 122 to which tasks are to be assigned. At the current time, processor 120 has a performance profile of P1 and processor 122 has a performance profile of P2, both as shown in FIG. 3. For example, processor 120 has a maximum performance level of 1 and a current performance level of 1. Processor 122 has a maximum performance level of ½ of the system's maximum performance level, and processor 122 has a current performance level of ½ of its own maximum performance level. The task distribution values of processors 120, 122 are respectively as follows:

$$D_{120P1} = 1/1/2 = 0.50$$

$$D_{122P2} = ½/½/2 = 0.50$$

Thus, the respective task distribution frequencies will be as follows:

$$f_{120P1} = 0.5/1.0 = 50\%$$

$$f_{122P2} = 0.5/1.0 = 50\%$$

In this example, scheduler 135 will assign tasks to processor 122 as often as to processor 120. Processors 120 and 122 will migrate towards an equilibrium state. For example, processor 120 will migrate from the P1 state to a state more like P5 in which processor 120 has a greater amount of processor headroom, and processor 122 will migrate from the P2 state to a state more like P4 in which processor 122 has a reduced (in this case, zero) amount of headroom.

In their initial states P1 and P2, the power consumption of processors 120, 122 is approximately 115 W. This is because processor 120 is consuming approximately 100 W, and processor 122 is consuming approximately 15 W, as shown in FIG. 3. In their "final" states (final for the present example), processor 120 is consuming approximately 65 W in state P5, and processor 122 is consuming approximately 40 W in state P4, achieving overall power consumption at 105 W. Thus, similar performance is achieved at lower power.

In an eight processor embodiment wherein processors P1-P7 have performance profiles as shown in FIG. 3, with an additional processor P0 having a performance profile identical to that of P1, the respective processor task distribution values are as follows:

$$D_{P0} = 1/1/8 = 0.1250$$

$$D_{P1} = 1/1/8 = 0.1250$$

$$D_{P2} = ½/½/8 = 0.1250$$

$$D_{P3} = 1/½/8 = 0.2500$$

$D_{P4}=½/1/8=0.0625$ $D_{P5}=1/¾/8=0.1670$ $D_{P6}=1/¾/8=0.1670$ $D_{P7}=1/½/8=0.2500$

Thus, the summation of task distribution values is 1.2715, and the task frequency distribution for each processor is as follows:

$f_{P0}=0.1250/1.2715=9.8\%$ $f_{P1}=0.1250/1.2715=9.8\%$ $f_{P2}=0.1250/1.2715=9.8\%$ $f_{P3}=0.2500/1.2715=19.7\%$ $f_{P4}=0.0625/1.2715=4.9\%$ $f_{P5}=0.1670/1.2715=13.1\%$ $f_{P6}=0.1670/1.2715=13.1\%$ $f_{P7}=0.2500/1.2715=19.7\%$

Scheduler 135 will assign tasks to processors P0-P7 according to the percentages calculated above.

Thus, various types of processor information are used to advantageously schedule tasks for processing by multiple processors. In certain embodiments, this can provide the advantage that power savings is maximized given a particular set of processor constraints. This is especially true in systems where the power level of individual processors is controllable. For example, by decreasing the load on particular processors, the clock frequencies and voltage level may be decreased, with a corresponding decrease in power consumption. Disparities in processor operation may be addressed so that more processors are operating at lower levels rather than fewer at higher levels.

This method is especially useful in implementations where the processors in system 100 have different maximum performance levels and/or changeable current performance levels. However, the method is also useful in more conventional embodiments in which each processor in system 100 is identical to the others. This is really just a special case embodiment in which the maximum performance level $MP_i$ and the current performance level $CP_i$ are equal to 1 for all processors. It is actually a more particular case to the more general case where all the processors have the same maximum performance and no performance headroom.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description.

In one embodiment, system 100 is a computer system such as a workstation or computer server system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, various wireless devices and embedded systems. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Those skilled in the art will recognize that boundaries between logic blocks are merely illustrative and that alternative embodiments may merge logic blocks or circuit elements or impose an alternate decomposition of functionality upon various logic blocks or circuit elements. Moreover, alternative embodiments may combine multiple instances of a particular component. Similarly, those skilled in the art will recognize that boundaries between the functionality of the steps and operations shown in FIG. 2 and described above are merely illustrative. The functionality of multiple operations may be combined into a single operation, and/or the functionality of single operations may be distributed in additional operations. Moreover, alternative embodiments may include multiple instances of a particular operation, and the order of operations may be altered and/or some operations may occur simultaneously in various other embodiments.

Unless specifically restricted, the operations discussed herein may consist of steps carried out by system users, hardware modules and/or software modules. Thus, the operations referred to herein may correspond to modules or portions of modules (e.g., software, firmware or hardware modules). For example, although the described embodiment includes software modules, the various exemplary modules may be application specific or general purpose hardware modules. The software modules discussed herein may include script, batch or other executable files, or combinations and/or portions of such files. The software modules may include a computer program or subroutines thereof encoded in computer-readable media. The functionality of operations referred to herein may correspond to the functionality of modules or portions of modules in various embodiments.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule.

Each of the blocks/operations of FIG. 2 may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by system 100, for example, from a computer readable media (e.g., memory 140 or another computer readable media). The computer readable media may be permanently, removably or remotely coupled to system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; spintronic memories; volatile storage media including registers, buffers or caches, main memory, RAM, etc.; and data transmission media including computer networks, point-to-point telecommunication equipment, and carrier wave transmission media, just to name a few. Other new and various types of computer-readable media may be used to store and/or transmit the software modules discussed herein.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A method of scheduling tasks in a multi-processor system, the method comprising:

computing a task distribution frequency for each of a plurality of processors of the multi-processor system thereby generating computed task distribution frequencies, wherein the task distribution frequency for each of the plurality of processors is computed based, at least in part, on a number of the plurality of processors, an individual maximum performance level for each of the plurality of processors, an individual current performance level for each of the plurality of processors, and a relative maximum performance level for each of the plurality of processors;

scheduling tasks to the plurality of processors in accordance with the computed task distribution frequencies; and wherein the relative maximum performance level of each of the processors is determined using the individual maximum performance level of each of the processors and a reference performance level.

2. The method of claim 1 further comprising:

determining the number of processors within the multi-processor system;

determining the individual maximum performance level of each of the processors; and determining the individual current performance level of each of the processors.

3. The method of claim 1 wherein the reference performance level is determined to be a highest of the individual maximum performance levels of the processors.

4. The method of claim 1 wherein computing the task distribution frequency comprises:
dividing the relative maximum performance level for each of the processors by the current performance level associated with a respective one of the processors to provide an initial result for each of the processors;
dividing the initial result for each of the processors by the number of the processors to provide a task distribution value $D_i$ for each of the processors;
summing the task distribution value $D_i$ for each of the processors to provide a task distribution sum; and
dividing the task distribution value for each of the processors by the task distribution sum to determine the task distribution frequency for each of the processors.

5. The method of claim 1 wherein computing the task distribution frequency comprises:
calculating $D_i=MP_i/CP_i/N$, where $D_i$ is defined as a task distribution value for an individual processor i, $MP_i$ is a relative maximum performance level for the processor i, $CP_i$ is a current performance level for the processor i, and N is the number of processors; and
calculating $$f_i = \frac{D_i}{\sum_{j=1}^{N} D_j}$$

where $f_i$ is the task distribution frequency.

6. The method of claim 2 wherein the determining the individual maximum performance level for each of the processors comprises accessing data by processor identifier to determine a corresponding processor type associated with the maximum performance level thereof.

7. The method of claim 6 wherein the determining the individual maximum performance level for each of the processors comprises one of querying a table, querying a database, and performing a table look-up.

8. The method of claim 2 wherein the determining the individual maximum performance level for each of the processors comprises scheduling benchmark tasks to each of the processors and using benchmark task results information to determine the individual maximum performance levels.

9. The method of claim 2 wherein the determining the individual maximum performance level for each of the processors comprises, for each of the processors, determining a current processor state and a processor type.

10. The method of claim 9, wherein the current processor state comprises at least one of current processor frequency, power level, and operating system time slice utilization.

11. A method in a multiprocessor system comprising:
determining performance information regarding each of a plurality of processors, wherein the performance information includes a current performance level for each processor;
determining a relative maximum performance level for each of the processors using respective individual maximum performance levels for each for the processors and a reference performance level;
determining respective task distribution values for respective ones of the processors according to, at least in part, the relative maximum performance level of each processor, the current performance level of each processor, and a number of processors in the multiprocessor system;
determining a task distribution frequency for each of the processors according to the task distribution values; and
scheduling tasks to each of the processors based at least in part on the performance information and the relative maximum performance level for each of the processors and according to the task distribution frequency for each processor.

12. The method of claim 11 wherein the reference performance level is determined to be a highest maximum performance level of the individual maximum performance levels.

13. The method of claim 11 wherein the number of processors is determined as a number of the processors to which tasks are to be scheduled.

14. The method of claim 11 wherein the scheduling tasks to the plurality of processors substantially achieves the task distribution frequency for each processor.

15. The method of claim 11 wherein determining the task distribution frequency for each processor comprises:
dividing the relative maximum performance level for each of the processors by the current performance level of each processor to provide an initial result for each of the processors;
dividing the initial result for each of the processors by the number of processors to provide the respective task distribution values for each of the processors;
summing the task distribution values to provide a task distribution sum; and
dividing respective ones of the task distribution values for each of the processors by the task distribution sum to generate the task distribution frequency for each processor.

16. The method of claim 11 wherein determining performance information further comprises determining a processor type of each of the processors by accessing a processor identifier.

17. A computer program product encoded in one or more computer storage media for executing by a computer, the computer program product comprising:
instructions for determining respective task distribution values for each of a plurality of processors of a multiprocessor system according to, at least in part, a relative maximum performance level of each processor, a current performance level of each processor, and a number of processors in the multiprocessor system, wherein the relative maximum level for each of the processors determined using an individual maximum performance level for each of the processors and a reference performance level;
instructions for determining as a scheduling value for each processor a task distribution frequency for each of the processors according to the task distribution values; and
instructions for scheduling tasks to the plurality of processors of the multi-processor system according to the scheduling value for each processor.

18. The computer program product of claim 17 further comprising instructions for scheduling tasks to the plurality of processors to substantially achieve the task distribution frequency for each of the processors.

19. The computer program product of claim 17 further comprising:
- instructions for dividing the relative maximum performance level for each of the processors by the current performance level of each processor to provide an initial result for each of the processors;
- instructions for dividing the initial result for each of the processors by the number of processors to provide the task distribution values for each of the processors;
- instructions for summing the task distribution values to provide a task distribution sum; and
- instructions for dividing respective task distribution values by the task distribution sum to generate the task distribution frequency for each processor.

20. The computer program product of claim 17 instructions for determining the reference performance level to be a highest maximum performance level of the individual maximum performance levels for each of the processors.

21. A multi-processor system comprising:
- a plurality of processors; and
- a scheduler coupled with the plurality of processors, the scheduler operable to schedule tasks to the processors in accordance with, at least in part, a current performance level for each processor and a relative maximum performance level for each processor, the relative maximum performance level for each processor based on a reference performance level and an individual maximum performance level for each processor;
- wherein the scheduler is operable to schedule tasks, at least in part, according to a task distribution frequency for each of the processors, each task distribution frequency determined using a task distribution value of each processor, each said task distribution value determined, at least in part, according to the relative maximum performance level of each processor, the current performance level of each processor, and a number of processors in the multiprocessor system.

22. The multi-processor system as recited in claim 21 wherein the task distribution frequency for each processor is determined according to a task distribution value for each processor divided by a sum of each task distribution value.

23. The multi-processor system as recited in claim 21 wherein the task distribution value of each processor is determined according to a division of the relative maximum performance level for each processor by the current performance level of each processor to provide an initial result for each of the processors and a division of the initial result for each of the processors by the number of processors to provide respective task distribution values for each of the processors.

24. The multi-processor system as recited in claim 21, wherein the task distribution frequency of each processor is computed in accordance with:

$$f_i = \frac{D_i}{\sum_{j=1}^{N} D_j}$$

wherein $D_i = MP_i/CP_i/N$, and wherein, $MP_i$ is the relative maximum performance level for a processor i, $CP_i$ is the current performance level of a processor i, and N is the number of processors.

* * * * *